Patented Jan. 30, 1951

2,540,048

UNITED STATES PATENT OFFICE 2,540,048

DYED TEXTILES AND METHODS AND COMPOSITION FOR PRODUCING SAME

Lyman P. Hill, Ridgewood, N. J., assignor to Interchemical Corporation, New York, N. Y., a corporation of Ohio No Drawing. Continuation of application Serial No. 298,764, October 10, 1939. This application November 16, 1943, Serial No. 510,512

12 Claims. (Cl. 117—161)

This invention relates to the dyeing of textiles, and has particular reference to a new and novel method of coloring cloth, in which the cloth is treated with a dispersion of pigment in a lacquer, the binder of which is a heat convertible synthetic resin, the pigmented lacquer being emulsified in water.

Textile fabrics are almost universally colored by being treated with a solution of a dyestuff in an aqueous medium; the soluble dyestuff is precipitated in the capillaries of the fibers of the yarns, or is caused to adhere chemically to the textile material. In some cases, water-insoluble dyestuffs having an affinity for certain synthetic fabrics are used in solution in other solvents. Since all of these dyestuffs must be capable of conversion from the soluble state to the insoluble state in contact with the fiber, and since they must be resistant to a great variety of deteriorating influences, the problem of inexpensive, fast textile colors has always been a pressing one.

The ready availability and low cost of the insoluble pigment colors has prompted many investigators to study the application of these colors for the dyeing of textiles, but with relatively little success. Except where the pigment is incorporated into a spinning solution used for making synthetic fibers, unaided mechanical adhesion of the pigment to the yarns has proven unsuccessful. Attempts to cause the pigment to adhere to the fabric by the use of binders have heretofore likewise proven abortive, for a variety of reasons. A principal cause has been the failure of the pigment binders to withstand the severe conditions to which textiles are subjected; the failure of the binder leaves the pigment in mere mechanical contact with the fabric, whence it is easily removed. A second important difficulty has been that of even application of very small quantities of pigment plus binder, so that the fabric is colored uniformly. The problem is presented by the tendency of pigments to flocculate or settle out in highly dispersed media, so that uniform application is very difficult.

I have discovered that successful dyeings of textile fabrics with pigments can be accomplished by treating the cloth with a pigmented water immiscible lacquer, the binder of which is a resin capable of heat conversion to a state of insolubility in organic solvents, reducing the concentration of solids and pigment by emulsifying the lacquer in water. After treatment with the dispersed pigmented lacquer, the fabric may be treated to convert the resin to the stage of insolubility in organic solvents. A preferred resin is the type obtained by the condensation of formaldehyde with carbamides. Such resins may be set by heating the fabric at temperatures ranging from 95 to 150° C. for periods of the order of 1 to 5 minutes.

Since the fabric absorbs large quantities of the dyeing emulsion, care must be taken in the pigment dyeing operation not to use such high concentrations of resin that the resultant dyed fabric will have an undesirable finish imparted to the fabric. I prefer to operate with resin concentrations of 2½% or less, in the finished dyeing bath, to prevent stiffening of the fabric with the resin. Higher concentrations are permissible only where a definite finishing effect is desired.

Another consideration of some importance is the volatility of the solvent employed. The even distribution of the color is attained not only by its original distribution in the lacquer, but by the maintenance of that distribution in the emulsion, and by the flow of the lacquer around the water soaked fibers of the textile yarns, whereby the lacquer is deposited as spaced films from the globules of discontinuous lacquer phase, rather than as beads. I have found that the solvent employed must evaporate no more rapidly than toluol at ordinary room temperatures (ca. 25° C.) if really even distribution of the pigment is to be obtained both in the emulsion and around the fibers.

Sufficient resin must be present to tightly bind the pigment to the fabric. A ratio of at least two volumes of binder to one of pigment should ordinarily be maintained, in order to get satisfactory binding action.

The fabric is treated by immersing in the liquid, the amount of liquid retained being regulated by squeeze rollers through which the fabric passes. Ordinarily, the cloth will absorb about its own weight of coloring material.

Care must be taken in the drying of fabrics dyed in this manner, in particular when heavier fabrics are colored, to insure evenness of dyeing. If the fabric is not maintained in a uniform state of tension, or if the drying is done unevenly, the color will tend to migrate and give a streaked appearance. Very satisfactory results can, however, be obtained with most fabrics by proper control of drying conditions.

Satisfactory dyeing solutions may be made as follows:

EXAMPLE 1.—BLACK 25 parts of a pigment dispersion (made by mixing 20 parts carbon black
40 parts alkyd resin solution, 65% resin, 35% xylol
40 parts xylene in a heavy duty dough mixer until the pigment is dispersed) are mixed with a lacquer consisting of—

2 parts urea formaldehyde resin solution (50% solvent soluble urea formaldehyde resin, 30% butanol, 20% xylene)
5 parts alkyd resin solution (50% in xylene)
10 parts pine oil
7 parts xylene This lacquer is then emulsified in an Eppenbach homogenizer with—

46 parts water
2 parts sodium lauryl sulfate
3 parts dry bentonite added to the emulsion, which is then passed through a colloid mill, and centrifuged.

This emulsion contains 9¾% of resin solids; this should be reduced to about 2½% or less, by reduction with water, to obtain an emulsion capable of coloring cloth without imparting an undesirable finish thereto.

The alkyd resin of the example can be made by reacting 148 parts of phthalic anhydride, 110 parts of glycerol and 125 parts of castor oil fatty acids at 230° C., in the presence of $CO_2$, until the acid number is about 8; it is preferably dissolved in equal parts of toluene while warm, directly after making.

The organic soluble urea formaldehyde resin can be made in any manner well known to the art. A preferred method of producing such a resin comprises reacting urea with 37% aqueous formaldehyde at a pH of about 4.5, using 2.5 mols of formaldehyde per mol of urea. The resinous watery initial condensate produced is then mixed with butanol, and refluxed for several hours; more butanol and some xylol are added, and the water, butanol and xylene are removed until the desired water-free solution of the resin is obtained.

EXAMPLE 2.—WHITE EMULSION 15 parts of pigment dispersion, made from
65 parts by weight titanium dioxide
30 parts by weight alkyd resin solution (65% resin, 35% xylene, made as the alkyd resin of Example 1, except that 75 parts of glycerol, 126 parts phthalic anhydride, and 108 parts of the fatty acids of cocoanut oil are used)
5 parts by weight xylene are diluted with—

10 parts white pine oil
48 parts Solvesso #2 (hydrogenated petroleum naphtha—distillation range 135—177° C.)

This mixture is added slowly to a mixture of—

2 parts sodium lauryl sulfate
25 parts water with vigorous agitation, to produce a pigmented lacquer-in-water emulsion, which may be diluted with water as desired. Care should be taken to avoid too prolonged stirring, which may invert the emulsion. This emulsion has 2.93% resin solids, and 9.75% pigment solids.

Preferably, one part of the pigmented emulsion of Example 2 is diluted before use with at least four parts of water, followed by one part of a clear emulsion prepared as follows:

EXAMPLE 3.—CLEAR EMULSION 50 parts of a lacquer consisting of—

10.0 parts urea formaldehyde resin solution of Example 1
30.0 parts alkyd resin of Example 1, 50% solution in pine oil
5.0 parts white pine oil
55.0 parts Solvesso #2 are added slowly, with stirring, to a solution of—

2.5 parts sodium lauryl sulfate
47.5 parts water to produce a stable clear lacquer-in-water emulsion containing 10% resin solids.

For the 2.5 parts of sodium lauryl sulfate, 1.5 parts of water and 1.5 parts of Aerosol O. T. (sodium salt of alkyl ester of sulfo succinic acid) may be used.

EXAMPLE 4

A very satisfactory white delustering bath can be prepared by mixing 1 part of the white emulsion of Example 2 with 4 parts water and adding 1 part of the clear emulsion of Example 3.

The resultant dye bath has a resin concentration of about 2.2%, and a pigment concentration of about 1.6%.

EXAMPLE 5.—YELLOW EMULSION 6.5 parts of a 20% aqueous pulp of yellow pigment, prepared by diazotizing dichlorbenzidine and coupling with acetoacetanilide
.25 part of a 35% aqueous solution of sulfonated tannin are stirred together on a high speed mixer, and added to a mixture of—

8.5 parts alkyd resin solution of Example 2
10.0 parts pine oil

The resultant water-in-lacquer emulsion is diluted with 48.0 parts Solvesso #2 and added slowly, on a high speed mixer, to a solution of—

2.0 parts sodium lauryl sulfate
24.75 parts water

The emulsion inverts as it enters the water, producing a stable lacquer-in-water emulsion having 1.3% pigment solids, and 5.5% resin solids. This is preferably mixed with four parts of water and one part of the clear emulsion of Example 3, before using. The resultant dyeing solution then carries a maximum of .21% pigment and 2.6% resin solids.

EXAMPLE 6.—AZO BLUE 5.5 parts 20% aqueous pulp of blue pigment formed by diazotizing dianisidine, and coupling it with the sodium salt of the ortho toluidide of beta oxy naphthoic acid (Naphthol ASD)
0.5 part triethanolamine
0.25 part oleic acid are stirred together, and added to—

6.25 parts alkyd resin solution of Example 2
10.0 parts pine oil

The water-in-lacquer emulsion is diluted with 50.5 parts Solvesso #2 and the emulsion is inverted by pouring it, with stirring, into a solution of 2.0 parts sodium lauryl sulfate in 25.0 parts water.

This lacquer-in-water emulsion contains 1.1 pigment solids and 4.1 resin solids. On minimum dilution with 4 parts of water and 1 part of clear, the pigment solids of the dye bath is 1.8, and the resin solids 2.3%.

EXAMPLE 7.—ANTHRAQUINONE BLUE

*Solution A*

5 parts 20% aqueous pulp of a blue pigment—3:3 dichloro - N - dihydro 1:2:1':2'-anthraquinone azine
2.5 parts 50% aqueous urea formaldehyde condensate

*Solution B*

7.5 parts alkyd resin solution of Example 2
10.0 parts white pine oil
48.0 parts Solvesso #2

*Solution C*

2 parts sodium lauryl sulfate
25 parts water

Solution A is mixed with 1 part of Solution C, and put through a colloid mill. Solution B is added to the residue of Solution C (26 parts) and an emulsion is made; thereafter, the milled pigment pulp is added to the emulsion.

This emulsion is preferably diluted with water and mixed with the clear emulsion of Example 3, to ensure a maximum resin solids of about 2.5%

While I have disclosed but a few examples of dyeing emulsions, the examples can be multiplied indefinitely without departing from the scope of my invention. Where resistance to washing and dry cleaning are not important, substantially any pigments or binders may be used, provided care is taken to maintain the conditions necessary for appearance and hand. Where quality dyeing is desired, however, the pigments and binders must be so chosen as to resist dry cleaning solvents and washing. As indicated above, best results are obtained with the carbamide formaldehyde resins, including the resins made from formaldehyde and urea, thiourea, melamine, and other urea derivatives and substituted ureas. Phenol formaldehyde resins, and other resins which can be set rapidly at elevated temperatures, may also be used, although the results obtained with them are not as satisfactory as those obtained with the carbamide formaldehyde resins.

Any emulsifying agent can be used to prepare the emulsions, provided it makes a stable emulsion with the particular lacquer. I have successfully used Lamepon A (protein composition products condensed with fatty acids). Santomerse D (sodium salts of alkyl substituted aryl sulfonates), various sodium alkyl sulfates, and others, as well as those shown in the examples.

The term lacquer, as used in the claims, refers to solutions, in volatile organic solvents, of film forming binders or thickeners which are water-insoluble, and which are plastic or solid, so that when the solvent evaporates, the binder forms a film which is substantially set where deposited.

This application is a continuation of my application Serial No. 298,764, which was filed on October 10, 1939, and now abandoned.

I claim:

1. A dye bath for textiles comprising an emulsion of a water-immiscible pigmented lacquer distributed in a continuous aqueous phase, the binder of the lacquer comprising a resin hardenable by heat to the stage of insolubility in organic solvents, said binder comprising not over 2.5% of the total dye bath, and being present in at least twice the volume of the pigment, the solvent of the lacquer being no more volatile than toluol at 25° C.

2. The method of dyeing to produce a solid color effect, which comprises subjecting textile materials to an emulsion comprising lacquer uniformly dispersed in an aqueous medium, the lacquer comprising resin and organic solvent and containing coloring matter, and then drying the textile material to form a product comprising textile material having coloring matter bonded to its fibers by films of resinous substance.

3. The method of treating porous textile materials having fibers comprising as a step, applying to fibers of the yarns of the fabric an aqueous dispersion of water-insoluble resin, water-insoluble coloring matter and water-insoluble organic solvent for the resin, the consistency of the dispersion being so thin that the lacquer flows around the fibers of the yarns, and drying the material to leave a thin film of resin and coloring matter around the fibers without stiffening the material.

4. A solid-colored textile material comprising a fabric having fibers, and means covering the fibers to color the same, said means comprising thin films of resinous substance containing coloring matter, the material being, to the naked eye, of a uniform color and appearance.

5. The art of pad dyeing to produce a solid color effect which comprises subjecting textile materials having discrete fibers to an emulsion comprising fine droplets of organic solvent uniformly dispersed in an aqueous medium, the individual droplets having dissolved therein a resinous substance containing coloring matter, and then drying the textile material to form a product comprising textile material having coloring matter bonded to its discrete fibers by a substantially continuous film of resinous substance.

6. A solid-colored textile material comprising a fabric having discrete fibers, and means substantially covering the discrete fibers to color the same, said means comprising a thin substantially continuous film of resinous substance containing coloring matter, the material being, to the naked eye, of a uniform color and appearance, substantially identical with the product of claim 7.

7. The art of treating porous textile materials having discrete fibers comprising as a step, applying to discrete fibers of the structural yarns of the fabric an aqueous dispersion of water-insoluble resin, water-insoluble coloring matter and water-insoluble organic solvent for the resin, the consistency of the dispersion being so thin as to leave said interstices open, the organic solvent being of a nature as to carry the dispersed resins and coloring matter into the capillary spaces of the material, and drying the material to leave a thin coating of resin and coloring matter around the discrete fibrers without materially affecting the porosity of the material.

8. The method of dyeing porous textile materials having discrete fibers which comprises applying to the material coloring matter emulsified with a solvent and a resin in water, the emulsion being so thin that the droplets of solvent containing coloring matter and resin are carried into the discrete fibers of the material, and then drying the material to deposit a thin film of resin containing coloring matter on the discrete fibers of the material without materially affecting the porosity thereof.

9. The art of treating porous textile materials having discrete fibers comprising, as a step, applying to discrete fifers of the structural yarns of the fabric an aqueous dispersion of water-insoluble resin, water-insoluble coloring matter and water-insoluble organic solvent for the resin, said dispersion comprising a volatile content of at least 80% by weight and being of such thinness as to provide a relatively fine oil-in-water emulsion in which the tiny droplets of organic solvent containing the water-insoluble resin and water insoluble coloring matter comprising the disperse phase, the consistency of the emulsion being such that the liquid will enter the capillary spaces of the textile material, whereby the droplets of organic solvent containing dissolved water-insoluble resin and water-insoluble coloring matter are adsorbed by the textile material due to the high affinity of the organic solvent for the textile material, and drying the material to leave a thin coating of resin and coloring matter on the discrete fibers of the material without materially affecting its porosity.

10. The art of pad dyeing to produce a solid color effect which comprises subjecting textile materials having discrete fibers to an emulsion comprising fine droplets of organic solvent uniformly dispersed in an aqueous medium, the individual droplets having dissolved therein a resinous substance which is heat-convertible to the insoluble stage, and containing pigment, and then drying the textile material to form a product comprising textile material having pigment bonded to its discrete fibers by a substantially continuous film of resinous substance.

11. A solid-colored textile material comprising a fabric having discrete fibers, and means substantially covering the discrete fibers to color the same, said means comprising a thin substantially continuous film of resinous substance which is heat-convertible to the insoluble stage, and containing pigment, the material being, to the naked eye, of a uniform color and appearance, substantially identical with the product of claim 7.

12. The art of treating porous textile materials having discrete fibers comprising as a step, applying to discrete fibers of the structural yarns of the fabric an aqueous dispersion of water-insoluble resin which is heat-convertible to the insoluble stage, and water-insoluble pigment and water-insoluble organic solvent for the resin, the consistency of the dispersion being so thin as to leave said interstices open, the organic solvent being of a nature as to carry the dispersed resins and pigment into the capillary spaces of the material, and drying the material to leave a thin coating of resin and pigment around the discrete fibers without materially affecting the porosity of the material.

LYMAN P. HILL.

REFERENCES CITED

The following references are of record in the file of this patent:

UNITED STATES PATENTS

| Number | Name | Date |
|---|---|---|
| 1,787,239 | Fleischmann | Dec. 30, 1930 |
| 1,822,533 | Lasker | Sept. 8, 1931 |
| 1,871,087 | Sckneevoight | Aug. 9, 1932 |
| 1,998,539 | Gams | Apr. 23, 1935 |
| 2,035,520 | Baird | Mar. 31, 1936 |
| 2,046,885 | Strain | July 7, 1936 |
| 2,071,419 | Moss | Feb. 23, 1937 |
| 2,097,012 | Bartell | Oct. 26, 1937 |
| 2,121,005 | Bener | June 21, 1938 |
| 2,123,152 | Rivat | July 5, 1938 |
| 2,196,367 | Thackston | Apr. 9, 1940 |
| 2,198,669 | Jenett | Apr. 30, 1940 |
| 2,334,199 | Jennings | Nov. 16, 1943 |

FOREIGN PATENTS

| Number | Country | Date |
|---|---|---|
| 349,988 | Great Britain | May 27, 1931 |
| 349,903 | Great Britain | May 27, 1931 |
| 461,650 | Great Britain | Feb. 22, 1937 |
| 485,198 | Great Britain | May 16, 1938 |